March 24, 1964     R. T. ERBAN     3,125,927
PROJECTION SCREEN
Filed April 28, 1960     5 Sheets-Sheet 1
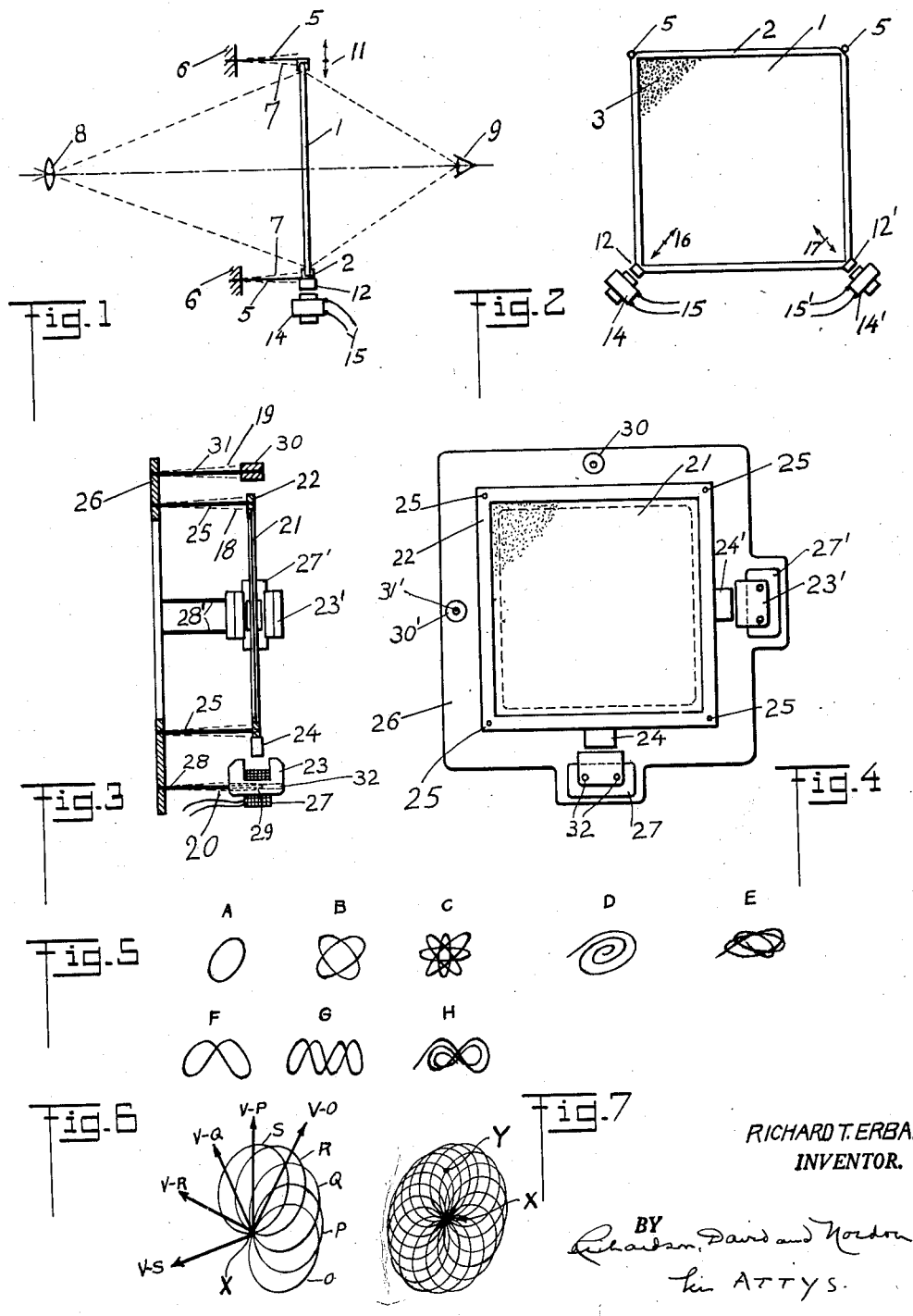
RICHARD T. ERBAN
INVENTOR.
BY Richardson, David and Norton
his ATTYS.

March 24, 1964 R. T. ERBAN 3,125,927
PROJECTION SCREEN
Filed April 28, 1960 5 Sheets-Sheet 2
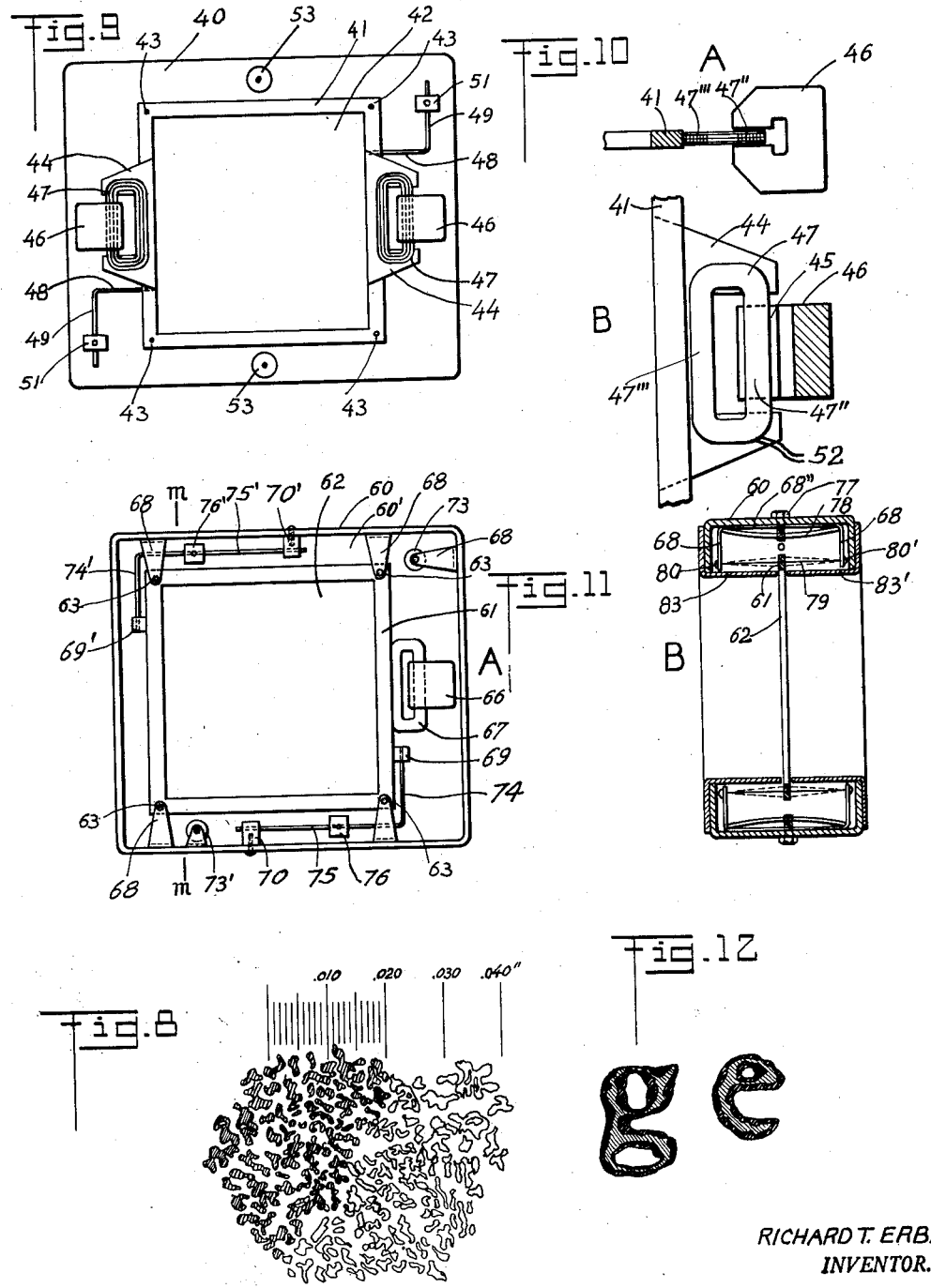
RICHARD T. ERBAN
INVENTOR.
BY Richardson, David and Nordon
his ATTYS.

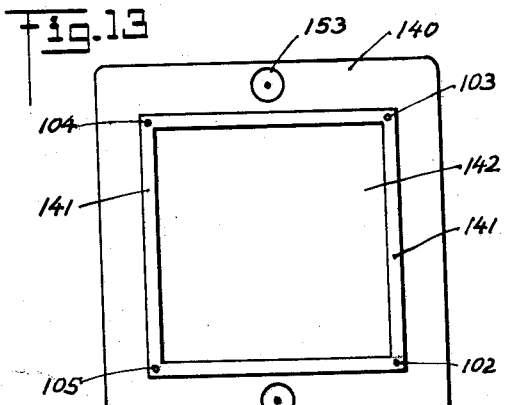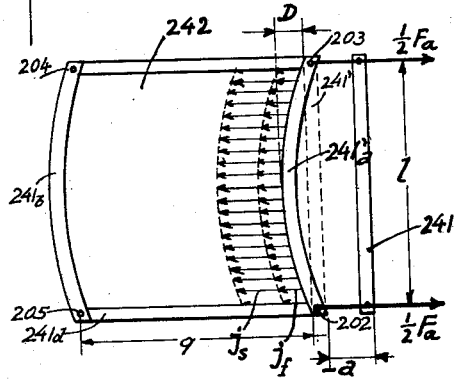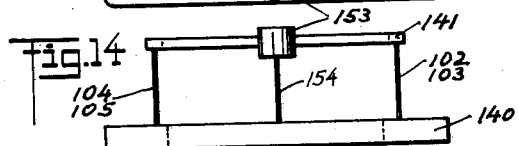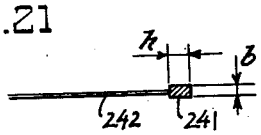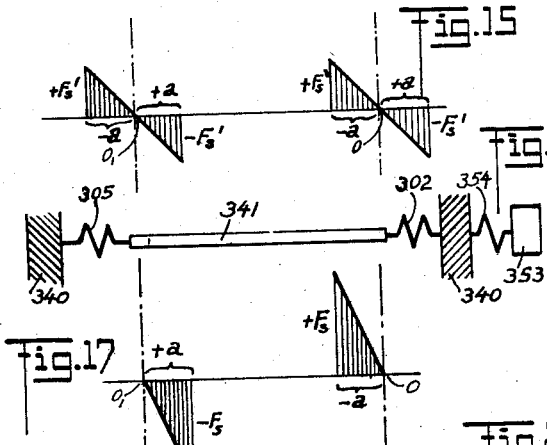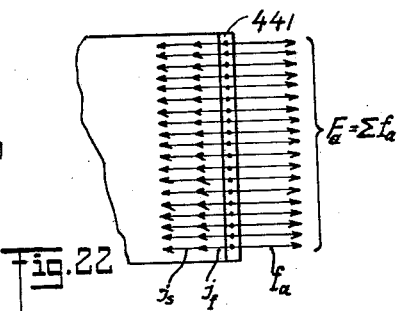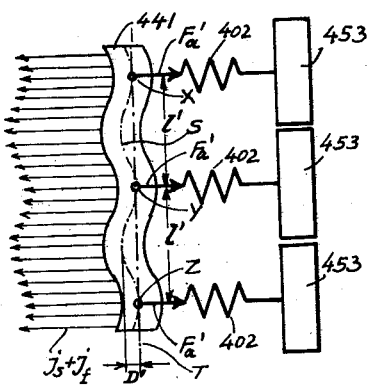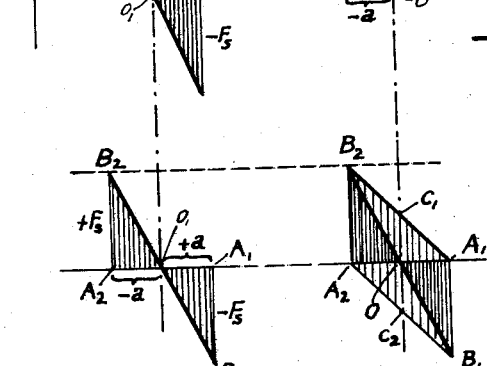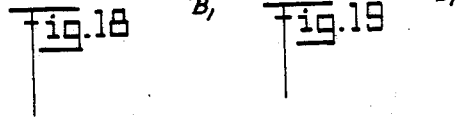
INVENTOR.
RICHARD T. ERBAN
BY E. M. Squire,
HIS ATTORNEY

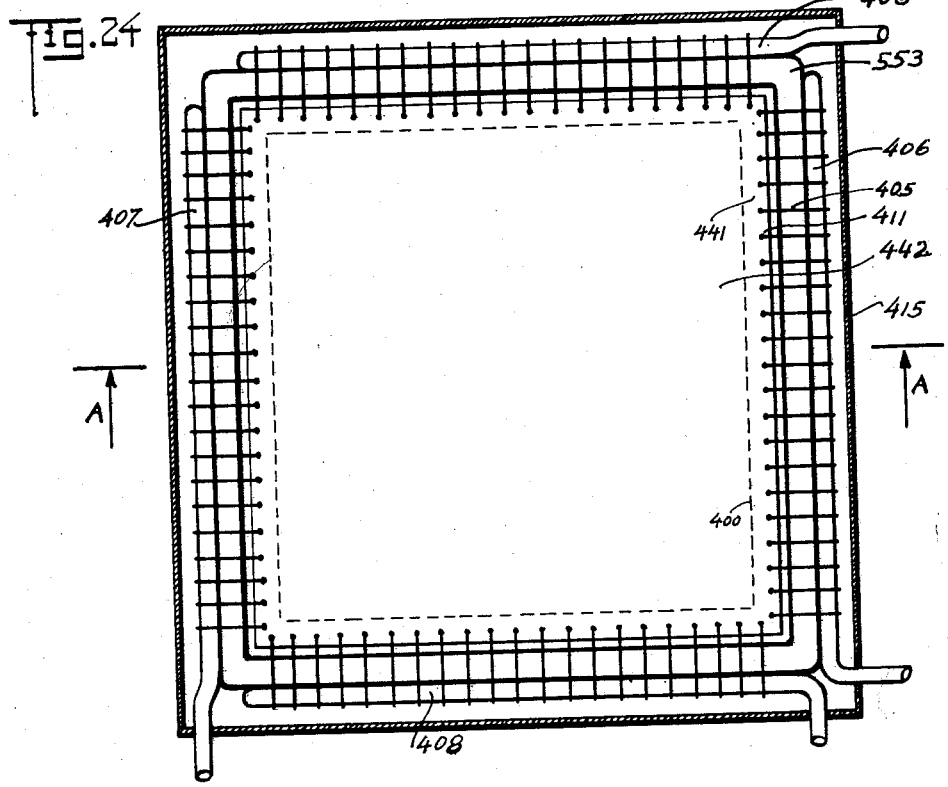
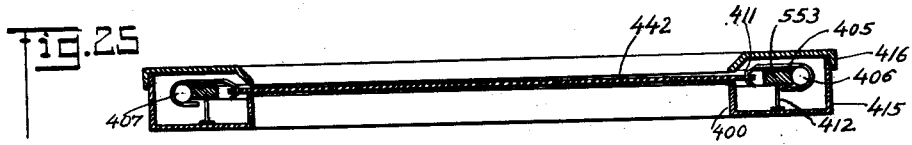
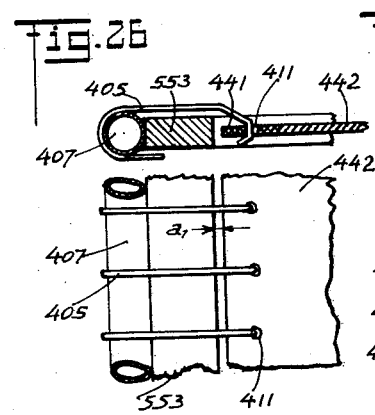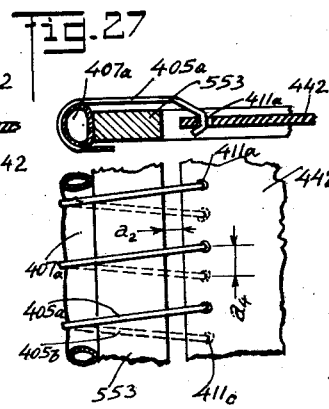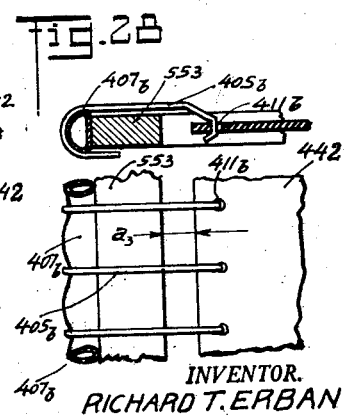
INVENTOR.
RICHARD T. ERBAN
BY E. M. Squire,
HIS ATTORNEY March 24, 1964  R. T. ERBAN  3,125,927
PROJECTION SCREEN
Filed April 28, 1960  5 Sheets-Sheet 5
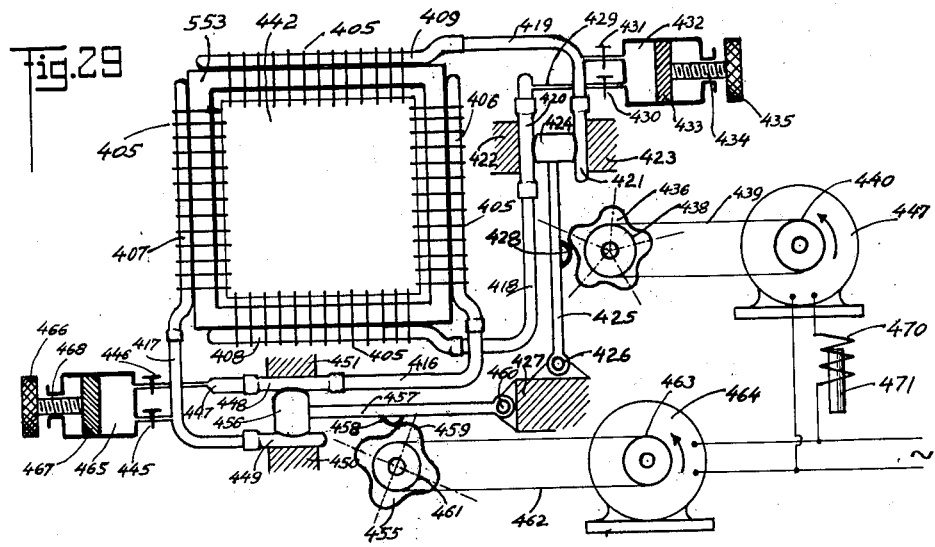
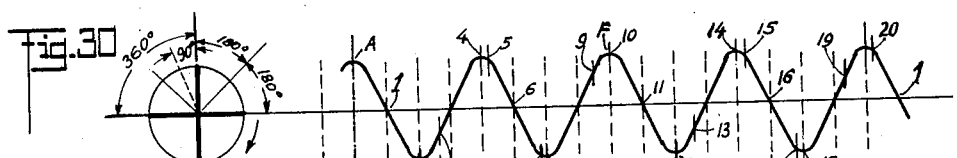
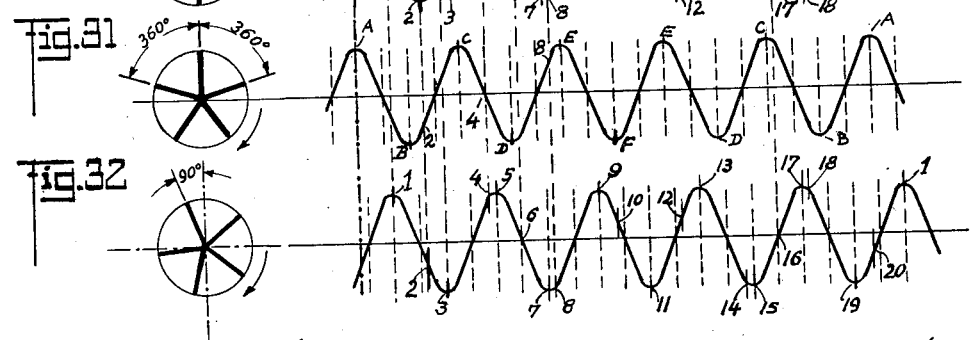
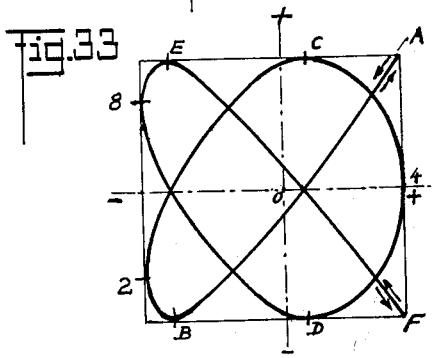
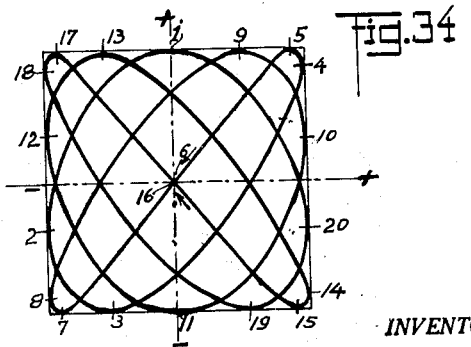
INVENTOR.
RICHARD T. ERBAN
BY E. M. Squire,
HIS ATTORNEY

United States Patent Office 3,125,927
Patented Mar. 24, 1964

1

3,125,927
PROJECTION SCREEN
Richard T. Erban, 145—38 Bayside Ave., Flushing, N.Y.
Filed Apr. 28, 1960, Ser. No. 25,478
21 Claims. (Cl. 88—28.9)

This invention relates to optical screens and similar means which are suitale for making visible to the eyes of an observer a projected image.

The present application is a continuation-in-part of my copending application, Serial No. 359,874 filed June 5, 1953, now abandoned, which, in turn, is a continuation-in-part of my previously copending application Serial No. 275,760 filed on March 10, 1952, now Patent No. 2,780,136, issued February 5, 1957, on said application Serial No. 275,760 being a continuation-in-part of formerly copending application Serial No. 754,548 filed on June 13, 1947 and now abandoned.

While I am aware of many kinds of projection screens which have been proposed, using various materials and surface structures, I have found in testing very many screens that they have serious shortcomings, and are far from a 100% efficiency when it comes to resolution (correct reproduction of fine detail), true contrast ratio, or even correct rendition of color values. This is particularly troublesome in the case of enlarged projected images, such as are produced by projection microscopes, optical comparators, microfilm and microphoto projectors and the like.

The following simple comparison will clearly show the extent to which these defects of conventional screens limit their usefulness, and at the same time it will point out the new field in the art of projection which is opened up by the present invention.

Small type print (2 point or 2½ point by printer's scale, the letters are about ⅓ as high as ordinary book print) is frequently used for foot notes, annotations, etc. It is fully (100%) readable for any normal eye, even if the print is not perfect, that is, letters not fully black, (lack of contrast) or if the letters are not well formed by clear sharp outlines (fuzziness).

The projected image from a microfilm or microphoto (opaque) from such small letter type is however illegible to a varying degree. If the contrast ratio is low, below 20%, the letters are altogether invisible. The same is observed with pencil written notes where usually a low contrast between pencil line and background prevails.

The minimum limitations for the normal human eye are usually given as 2% for contrast ratio (also called contrast sensibility of the eye) and 1 minute (arc) for subtended angle in resolution; this means a line which is .0029 inch wide seen at 10 inches distance. Since letters of the 2 point type are about .026 high and their bars between .003 and .005 wide, these letters are well above the minimum limit for the eye, and their projection should be perfectly readable, even if some slight imperfections in the photographic reproduction are taken into account. The difficulties experienced with this type is entirely due to the defects of conventional screens. The use of a hand magnifier between the eye and the screen does not materially improve the situation, because the defects of the screen are also magnified. In conclusion, it can be said that the efficiency of the conventional transmission screen (also called rear projection screen) is very low for small type print and it is practically zero for such print having a low contrast ratio. Similar results are found in the use of such screens in projection microscopes, spectrometers, where fine lines of low contrast ratio are practically invisible, so that the screen cannot be used and must be replaced by subjective observation means (eye piece).

In contrast thereto, a screen in accordance with this invention has an efficiency of practically 100% as to resolution and contrast within the limits for the human eye. As far as resolution is concerned, the limits of the new screen are even higher, because the use of a magnifier between eye and screen will more than double it, as may be seen from the following experiment: a Bureau of Standards Resolution Target (diapositive) was projected with a high quality projection anastigmat, F:4.5, 2″ FL, at a screen so as to give 12.5 DIA magnification.

With the best available conventional screen, the readable maximum resolution was 120 to 125 lines per millimeter with the unaided eye, and 150 lines with a 10 power magnifier.

With the screen according to this invention, the resolution obtained was 150 to 165 lines with the unaided eye and 300 to 335 with a 10 power magnifier. In addition, all of the figures which numerate the groups of bars in #2 row were easily readable, while these same figures had been completely invisible on the conventional screen, due to their lower contrast ratio (grayish instead of black).

Thus, experiments show that the new screen according to this invention has a resolving power of more than 100% greater than known conventional transmission screens, and it has a near 100% efficiency in reproducing contrast in a range where the conventional screen has a zero efficiency.

The following specification and the annexed drawings are illustrative of how this invention may be carried out in convenient manner.

In the drawing:

FIGS. 1 and 2 show a side view and front view, respectively, of a general arrangement for projecting images upon a transmission screen in accordance with the invention;

FIGS. 3 and 4 show a side view and front view, respectively, of a preferred form of the new screen;

FIG. 5, sub A to H, shows diagrammatically a series of orbit forms which may be used in various embodiments of my invention;

FIG. 6 shows a vectorial diagram;

FIG. 7 shows in enlarged scale how the orbit path moves through one image point X;

FIG. 8 is a schematic illustration of a screen surface together with a scale of enlargement;

FIG. 9 is a front view of a modification of my invention;

FIG. 10, A and B, shows details of the structure disclosed in FIG. 9;

FIG. 11, A and B, discloses a still further modification where A is the front view and B is a side view of a section along the line m—m of A;

FIG. 12 is an illustration of how small type letters appear on a screen, seen at the same magnification as FIG. 8;

FIG. 13 is a schematic view of a screen of the type of FIG. 9, and FIG. 14 is an elevated or side view of the same, both figures serving to illustrate an analysis of the interaction between springs and screen;

FIG. 15 is a graph illustrating the operation of spring forces in the oscillating system of FIG. 14;

FIG. 16 is a schematic simplification of a mechanical equivalent to the system of FIG. 14;

FIGS. 17, 18, and 19 are graphs of spring performances for varying conditions of operation;

FIG. 20 is a simplified schematic illustration of internal forces of inertia in the oscillating system;

FIG. 21 illustrates a cross-section of parts of FIG. 20;

FIG. 22 is a schematic illustration of the application of the new principle of uniformly distributed balancing forces;

FIG. 23 illustrates an enlarged view of a portion of FIG. 22 and includes an embodiment of the modified new structure for achieving a uniform distribution of balancing forces;

FIG. 24 is a front view, partly in section, of a projection screen embodying the modified arrangement of FIG. 23;

FIG. 25 is a sectional view taken along the line A—A of FIG. 24, looking in the direction of the arrows;

FIGS. 26, 27 and 28 each show a partial section and partial top view of a small portion of FIGS. 24, 25, and each of these three figures illustrates successively the relative position of screen and balancing mass at different times during one cycle of oscillation;

FIG. 29 illustrates schematically a screen according to FIG. 24 together with a structure for exciting oscillations of the screen and for controlling the natural frequency of the system during its operation;

FIG. 30 illustrates in a vector diagram and rectangular coordinates the oscillation of a linear system with 4 cycles per one revolution of the vector diagram;

FIG. 31 illustrates the same for a system with 5 cycles for one revolution of the vector diagram, and with a phase angle of zero degrees;

FIG. 32 illustrates the same system as FIG. 31, but with a phase angle of 90 degrees behind the oscillation of FIG. 30;

FIG. 33 shows the orbital path of a point of the screen complying simultaneously to the oscillations of FIGS. 30 and 31; and FIG. 34 shows the orbital path for any point of the screen under the combined oscillations of FIGS. 30 and 32.

Referring to FIGS. 1 and 2, it will be found that a screen 1 is carried by a rim 2 and supported by four flexible members, or reeds 5 which may oscillate as indicated at 7. A solid base 6 supports the entire assembly. A projection objective illustrated at 8 projects an enlarged image upon the screen where it is viewed from the eye point 9. The screen is provided with a surface suitable to scatter light, such as a ground glass surface indicated at 3. Two adjacent corners of the rim 2 carry armatures 12, 12', and opposite each armature is positioned a solenoid or coil 14, 14' with lead in wires 15, 15'.

An inspection of these two figures shows that the screen is free to oscillate in any direction of its own plane, without deformation of the screen. It is also seen that the screen will oscillate in the direction stimulated by the resultant of the two vibrating power sources 14, 14'. To deliver periodic impulses, the two coils must be connected to a source of periodically varying current. This may be either A.C. current or periodically changing D.C..

It will also be seen that each point of the screen oscillates in a substantially rectilinear path as indicated at 11 (FIG. 1) and as indicated at 16 (FIG. 2) if only the coil 14 is operating, and similarly it will oscillate substantially rectilinearly as indicated at 17 when only the coil 14' is activated. If both coils 14 and 14' are simultaneously energized to produce equal forces in phase with each other, then the screen will oscillate in a straight line up and down.

Extensive tests have shown that a screen oscillating in a straight line will not produce the results sought for. Therefore, in accordance with this invention, the two coils are connected to sources of A.C. (or periodic current such as mentioned) and where it is provided for these two sources of A.C. power to have a difference of phase, and in certain arrangements also a difference of frequency. In any such case, one obtains a motion which follows an orbital path. If the frequencies are the same and the phase difference is 90°, the orbit is an ellipse which under certain conditions may become a circle.

However, the circular orbit is not important; and the basically elliptical orbit has several advantages over the purely circular form, as will be later explained. If the difference of phase is other than 90°, the ellipse will be inclined, such as illustrated in FIG. 5–A. This ellipse is made to shift between two positions, as illustrated in FIG. 5–B, by a slight periodic variation in either phase, or intensity of the current of one against the other. A steady drifting of the frequency of one as against the other produces an ellipse that keeps turning its position, as illustrated in FIG. 5–C, and the advantage of this form of orbit as against a circle is that the drifting ellipse makes contact with a great many points of the area which it covers while the circle contacts only the periphery points. Experiments have shown certain advantages in using orbits which change their position, as will be explained later.

FIGS. 3 and 4 show with all essential detail a preferred arrangement, in which a frame 26 carries a screen 21 by means of stilts or legs 25. These legs 25 are supporting the rim 22 to which the screen 21 is fastened. The supports 25 are capable of deflection, as shown at 18 (FIG. 3) so that the screen is capable of motion parallel to its own plane. Together with the spring force of the parts 25, the inertia masses of the rim 22 and the screen 21 form a mechanical free oscillating system. The rim 22 carries two magnetic armatures 24, 24' which are within the operational range of the magnetic fields of the magnetic core members 23, 23'. Exciter coils 27, 27' are suitably energized to produce a vibrating field of force.

The members 23, 23' together with the coils 27, 27' are mounted on deflectable supports 28, 28' which are also fastened to the common base 26. There are further provided two masses 30, 30' which are each mounted on a deflectable support 31, 31', respectively. Thus, there are provided two free oscillating systems, a primary system formed by the screen, its rim and the elastic supports 25 and a secondary system formed by the masses 30, 30' and their deflectable supports 31, 31', respectively. There are also provided two sources of vibrating power, the magnetic bodies 23, 23' together with their exciter coils 27, 27' and the masses of these power sources form also free oscillating systems with their respective flexible supports 28, 28'.

The primary oscillating system, that is the screen, will freely oscillate continuously as long as its energy losses are covered by power supplied from the two power sources. The orbit of the oscillating motion will be similar to that discussed with FIGS. 1 and 2, as to its shape. However, the system illustrated in FIGS. 3 and 4 is so arranged that no vibration is transmitted to the outside, as a result of the rapid motion of the screen. The inertia masses of the magnet members 23, 27 are supported on two stilts 28, and this system is tuned to the frequency of the alternating current, within 10% thereof. The mechanical free oscillating system which is formed by the screen-rim mass and their elastic support is also tuned to within 20% of the predetermined frequency required for the proper operation of the screen, as later explained. The secondary system of the masses 30, 30' and their elastic supports are tuned exactly to the frequency of the vibrating magnetic field of the power sources 23, 27 and 23', 27'.

As a result of this arrangement, with the centers of gravity of all masses arranged to be within one and the same plane, a complete absence of vibrations to the outside is achieved because of the opposite motions of the masses 30, 30' with respect to the screen mass, and also the opposite motion of the inertia mass of the magnet members 23, 27 and 23', 27', respectively, with respect to the screen mass. In order to prevent vibrations of higher order in the magnetic member 23, it is connected to its elastic supports in its center of gravity, as shown at 29 (FIG. 3). The member 23 has two holes 32 which give clearance to the elements 28 except at the center of gravity where 28 is fastened to 23.

It will be observed that the members 23, 23' are free to oscillate only in one direction, due to the two stilts 28, while the secondary masses 30, 30' are free to oscillate in every direction in the plane of the screen. Thus, the two masses 30, 30' are capable to compensate any unbalance left from the opposite motions of the screen and the magnetic members 23, 23'. It will also be observed that the amplitude of oscillation of the members 23, 23' will be smaller than that of the screen, due to the great mass of the members 23, 23'.

In order to be effective in the manner set forth above, the screen must oscillate in an orbital path as described, while any and all vibrations of the screen laterally to this orbital motion must be prevented. Since the screen is fairly stiff from edge to edge, but has very little rigidity laterally, or at right angles to its surface, it can very easily be excited into vibrations laterally to its surface. Such vibrations cause a blurred image, because the image cannot be seen sharply due to the rapid motion which the eye cannot follow. I have found that to prevent such disturbing vibrations, it is necessary to eliminate any sudden accelerations or shocks upon the screen from its edges. This invention therefore employs a connecting link between the vibrating power source and the screen, which has no backlash, will not transmit shock because it is yieldable, and which has an inertia of practically zero so that it cannot form an oscillating system with any frequency that is anywhere near the harmonics of the screen. While the structure disclosed is not the only one that can be employed to achieve these results, it is one of the preferred forms for carrying out this invention. The magnetic field of force which transmits the impulses of vibrating power directly to the screen acts like a filter that holds back all other vibrations from reaching the screen, and this is one of its important functions. I am aware that the magnetic field could, with certain modifications, be replaced by an electrical field, using the forces between electrically charged bodies, but I prefer the structure as described using magnetic fields; while the two arrangements so far described make use of strictly magnetic attraction, the following examples use the so-called electro-dynamic principle, in which a coil or current conductor interacts directly with a magnetic field. This method has certain advantages, because the mass of inertia of the coil is usually smaller than that of an iron armature, so that the springs which cause the screen to oscillate need not be so strong than in that other case. But the more important reason is that the force obtained with a coil can be more easily controlled as to its changes while the screen is oscillating. While the force with an iron armature can theoretically be made constant, or proportional to the amplitude, so as to fulfill the conditions for a harmonic vibration, it is much easier to do this with an electro-dynamic system, and the results are more lasting. Again it is important to avoid non-harmonic vibrations in order to reduce the trouble causing higher order frequencies.

In FIG. 9 the arrangement is very similar to that of FIG. 4. A base-frame 40 carries a screen 42 with rim 41 on elastic stilts 43, whereby a mechanical system for free oscillation is formed. The rim 41 of the screen carries on two brackets on opposing sides 44 and 44', two flat coils 47 and 47' so that they are fast to and moving always in unison with the rim 41 and screen 42. Positioned to the sides of the screen are two magnetic members 46, 46' which have a gap that engages one side of one coil each. This is more clearly shown in FIGS. 10–A and B, where the side 47" of the coil is engaged in the magnetic gap of the member 46, while the other side of the coil 47''' is free. Leads 52, not shown in FIG. 9, serve to connect the coils to a suitable power source. FIG. 9 shows two vibrating power devices acting upon the edge of the screen on two opposite sides thereof. The elastic stilts 43 which support the screen are for the moment supposed to be the same kind as shown in FIG. 3 at 25. The structure shown so far would produce a vibration (or oscillation) of the screen in one direction only.

In order to produce an orbital motion, in curves similar to those shown in FIG. 5, the edge or frame of the screen 42 is provided with two auxiliary masses which are connected to the rim 41 by means of elastic elements 48, 49 upon which the auxiliary masses 51 are adjustable. By suitable adjustment of the frequency of the masses 51, and the length of the two portions 48, 49 relatively to each other, a great variety of orbital motion can be obtained, although the screen is excited to vibration in one direction only. The reason for this is that this screen with its auxiliary mass will move in an orbital path whenever it is displaced from its central resting position into which the supporting stilts 43 return it when no outside force acts upon it. But due to the auxiliary masses and their yieldable connection, this screen cannot return to its rest position in a straight path like the screen shown in FIGS. 1 and 2 would do; screen 42 must return in something like a spiral path as schematically indicated in FIGS. 5–D and E. The path E corresponds to a system where a slight change or shift of energy between the two inertia masses (screen and rim against masses 51) takes place, or when a slight difference of frequency exists between the two directions. The two free oscillating masses 53, 53 each one moving with their center of gravity within the plane of the screen, compensate by their oscillation in 180° phase to the screen oscillation all vibration to the outside. It is evident that the masses 53 will describe orbital paths similar to, but opposite to the screen 41.

The arrangement shown in FIGS. 11A and 11B illustrates a system which has only one source of vibrating power, the coil 67 with the magnetic field body 66 forming an electro-dynamic system, exciting the screen in one direction of oscillation. The support of the screen 62 with rim 61 is somewhat different from the former arrangements. Instead of being supported by free vibrating stilts, or reeds, the rim 61 is fastened to four flexible tension members, or strings 79, which in turn are pre-stressed in tension between the two horns 68, 68 of a U-shaped bracket 68'' (see B FIG. 11). All of these brackets are carried by a common frame 60 which surrounds the entire screen. By adjusting the screw 77, the element 78 presses against the ends of the bracket 68, 68 and increases the pre-stress in the tension member 79. In this way the free oscillating system which comprises the screen can be tuned, much as any musical instrument by changing the tension in its strings. The auxiliary masses 73, 73' are likewise mounted on tensioned strings so that they too can be tuned to the desired frequency. In order to completely eliminate vibrations to the outside, it is important that the auxiliary masses and their strings should be accurately tuned.

The screen and its coil-magnet system 66, 67 are again only a one direction oscillating system, which is changed into an orbital motion system by providing masses which are so mounted that they move with a difference of phase and direction to the screen proper. It is also to be observed that similar to the structure described with FIG. 9, the operation of these masses is brought about by the motion of the screen itself. The resistance of these yieldably connected masses 76, 76' to any motion of the screen causes their displacement laterally of the direction of motion of the screen. This force of resistance is in phase behind the force which causes the motion of the screen itself, and the reaction to this resistance acts upon the screen, also with a difference in phase and at a substantial angle to the direction of the original motion. The result is again an orbital motion of the screen, although the exciting force is only uni-directional. This screen, like the one described in FIG. 9, returns to its central position of rest in a basically spiral path whenever it is displaced from it. The power source serves to displace it periodically from that central position and in tune with the natural frequency of the system.

It is to be noted that the yieldable elements 74, 75 and 74', 75' which are fastened to the rim 61 at the brackets 69, 69' are also fastened to the base frame 60 at the points 70, 70'. They serve therefore also as a spring force which tends to return the screen to its central position and which, together with its inertia mass, determines the frequency of the primary oscillating system of the screen. The masses 76, 76' cause a difference of phase in the lateral forces acting upon the screen as a result of the deformation of the springs 74, 75 and 74', 75', and an orbital motion is obtained.

So far it has been supposed that the spring-stiffness of the yieldable supports of the screen and rim, that is, the reeds or stilts in FIGS. 3 and 9 were the same in both directions, or at least substantially so. They would be so if round wire is used for their manufacture. If flat wire is used, which has a rectangular section, the spring-stiffness (or spring constant, that is the force in pounds per unit of deflection obtained) would be different in the two directions. And with the same inertia mass, the system would have two different frequencies, depending on the direction. The result will be an orbital path that may be a figure "8," or a distorted "eight such as seen in F, FIG. 5" which comes about near a 1:2 ratio of frequencies. Such a system will return to its central resting position in a shrinking figure "eight" as illustrated at "H," FIG. 5. If the frequency ratio is other than 1:2, complex orbital paths with multiple crossings may be obtained as later more fully explained.

It has been pointed out above that I have found straight line motion of the oscillating screen is not producing the desired resolving power. The images appear streaky, comparable to something printed on rough linen, and all fine detail of the image is lost. It was therefore necessary to provide an orbital motion; but even here, several specific conditions must be observed. These were found out in my experiments and several seem to have no support in logical deductions from known properties of the eye.

FIGS. 6, 7 and 8 have been added in order to explain some of these phenomena, although no attempt is made to give a full explanation or theory of this matter.

The basic trouble with the conventional type screen seems to stem from the irregularity of their surface, and the fact that the light scattering power, as well as local light absorption, varies greatly along the "grain" of the screen. And while the eye can barely see the individual grain, as it is just around or a little below the limit for resolution, if taken as 1 minute subtended angle at 10 inches distance, the eye is well aware of the integrated effect of such small objects. FIG. 8 has been made by outlining the dark areas of a normal, very fine grain, ground glass type screen, by projecting them directly upon the paper and following the outlines of the darker areas. The difference in brightness is not uniform for all spots, and varies even within each spot, and while the average difference between bright spot and dark spot is near 20% there are irregular spots which go up to 50% and over. The spots on the right hand side are indicated only by their outline, while those on the left side are cross hatched. Since the cross hatching does not give the right contrast, it was used only in a part of the sketch to indicate what part of the encircled area was thought to be dark and which part bright. The scale shown above the spotty surface is the projection upon the same paper, with the same magnification, of an objective micrometer scale, showing .001 inch between each of the narrow lines and .010 inch between the longer lines. The field shown is thus a little over .040" in length and the dark spots are seen to have about .002" width (some .001") and varying length, an average of about .005 inch. It appears from this figure that one should expect a light value average between dark and bright areas, free of flicker, if the number of changes between bright and dark is about the limit of the known "flicker sensitivity" of the human eye, or a little over it. This factor is given by researchers in that field as 39 changes per second for an illumination of ten candle power per square meter and over, within a reasonable range. It is much less for lower intensity of illumination. If an orbit of approximately circular shape having a mean diameter of about 0.010 is considered, and superimposed upon the screen texture shown in FIG. 8, it is seen that an image point travelling along the orbit periphery will pass through at least ten changes between bright and dark for each complete orbit, or cycle, of the oscillating screen. If this figure of ten changes between bright and dark for one orbit is used together with the flicker sensitivity limit of 39 per second as above mention, it appears that $39/10$, that is, about 4 full orbit peripheries per second will provide the required minimum of 39 changes per second between bright and dark. Any higher speed would have to be free of flicker and should produce an even background due to the intermixing of so many elements. I have found that much higher speeds are required to obtain flicker free images, and that an orbit of about .040" average diameter is just about the low limit for orbit size with the screen texture as shown, it is preferable to use an orbit size of between .050 and .060 in order to get an "even" effect on the screen. With orbit sizes of about .040 diameter or a little smaller, the screen may be free from flicker, but it has the effect of being composed of thousands of very small fish scales, and this is disturbing to the eye. Above the quoted size of around .050" this effect disappears and any further increase in orbit size will not substantially alter the appearance of the screen surface, nor will it have any noticeable effect on resolving power. The "fish-scale" effect above mentioned is visible even at orbit cyclic speeds of over 50 per second, but it disappears at as low as 15–20 cycles per second if the orbit size is increased as indicated. The minimum size for the orbit seems to be dependent primarily upon the screen texture, that is the size of dark and bright spots and their grouping into little areas of dark and light, while the cyclic speed is only a secondary factor. The optimum of the cyclic speed for elimination of flicker has been found to be between 25 and about 100 cycles per second; although speeds up to 120 cycles have been successfully used, there seems to be no further improvement in higher speeds. Higher and lower speeds than the optimum may be used in orbit forms such as illustrated in FIG. 5, C, F, and G, where the basic frequency may be near the lower end of the range and the second frequency near the higher end so that a rapid scanning motion of the orbit area is obtained.

The motion of the screen surface through an image point X, is illustrated in FIG. 6; it is seen that the entire length of the orbital path traverses the point X while at the same time the direction of motion through the image point changes not only its size, but also its direction. The linear velocity, shown at V—O rotates like a vector through the positions V—P, V—Q, V—R, V—S and on till the cycle is completed. This rotation of the speed vector appears to be an important factor in the performance of this new screen; if it is eliminated, without changing either maximum linear speed or frequency of oscillation, which may be done in a system as illustrated in FIG. 3 by switching the phase difference from around 90° to exactly zero degrees, the image becomes instantly fuzzy and streaky.

FIG. 7 illustrates the motion of the screen with respect to an image point X during one complete cycle. It may be seen that the successive positions of the orbital path not only intersect in the point X, but also in another point Y for each two positions of the orbital path. Thus, there are rings around the point X which are formed of such secondary intersection points Y. Only a single point Y has been shown, or marked, because all of the possible points Y would completely cover the entire field surrounding the point X. It is seen that a multiple covering all of points is obtained in this way. The degree of multiple covering is further increased by the use of orbits of figure eight form, because the number of points of intersection of two neighboring orbits is increased to more than two points.

In order to allow a comparison of screen structure (surface spots) and projected letters, there is illustrated in FIG. 12 a letter "g" and a letter "e" from a very clear and sharp print of the so called 2 point type; the magnification is the same as that of the screen spots, and the images have been obtained by direct projection onto the paper and tracing the outlines of the printer's ink. It is seen how the ink does not fill the letters, but makes only a narrow zone along the outlines, leaving the interior a narrow zone of medium gray. Since some of the narrow parts of these letters are of similar width as some of the dark spots of the screen, it is understandable why they are blotted out completely whenever the contrast of the letters approaches that of the screen spots; it also appears understandable how the shape of letters of this size may, by superposition of the screen surface, be distorted to varying degree, from a mild case of eye strain to full illegibility.

I have found that a screen, having a surface of the kind and texture as described and illustrated, requires a size of orbital motion of about .050 to .075 inch for best results, although a marked improvement in the performance over that of a conventional screen is already obtained with smaller orbits of about .035 inch approximate diameter. Below this size a sharp drop in performance is observed. This may be interpreted to point out that an orbit of about 5 to 10 times the size of the spotty areas of the screen is required for best results. The range for the frequency, or cyclic speed of orbit motion has been previously given. The optimum frequency, preferably between 60 and 70 cycles per second, can only be used to advantage if all surface vibrations of the screen (that is at right angles to the plane of the screen) are completely prevented or suppressed. It is for this reason that the fully automatic dynamic balancing of the screen motion, as illustrated in FIGS. 3 to 11 of this application, becomes a very important part of this invention. While it is possible to achieve a full dynamic balancing by power driven balancing masses, such as described in my Letters Patent No. 2,780,136, such methods require complex and expensive apparatus. In contrast thereto the present structures are simple, of relatively low cost of manufacture, and they may be tuned to their proper frequency as easily as a musical instrument. The combination of a projection screen with a yieldable support of properly selected spring stiffness (spring constant) in order to form a free oscillating mechanical system of predetermined frequency is therefore another important part of this invention.

Where the application of my invention is contemplated under particular conditions of operation, such as high oscillating frequencies, special requirements with respect to orbit shape, amplitude or oscillation and dimensions of screen, the embodiments illustrated in FIGS. 23 to 34 may be found to be preferable. In order to give a clear explanation of the operation of this modification, a brief outline of the effects of internal forces in oscillating systems of the kind herein described shall be given in connection with FIGS. 13 to 23.

FIGS. 13 and 14 show in top view and elevated view respectively, a structure which is similar to that shown in FIG. 9, with the exception that the electro-magnetic means 46, 47 and the mechanical means for causing a shifting of phase 49, 51 have been omitted. Those parts in FIGS. 13 and 14 which are identical with parts in FIG. 9 have been given the same reference numbers increased by 100 for quick identification; thus, the frame 41 of FIG. 9 becomes 141 in FIG. 13, and so on. The four reeds which support the frame at the four corners have been given separate numbers because in the following analysis it is necessary to treat them individually.

The following explanations will be simplified by first considering the case of a rectilinear oscillation of the system of FIG. 13 and FIG. 14. Accordingly, it is postulated that the frame 141 and screen 142 oscillate in a direction from right to left, and that this motion is dynamically balanced by the motion of the free oscillating masses 153. It is further postulated that the amplitude of oscillation of all four reeds, 102, 103, 104 and 105 is small as compared to the length of the reeds, so that the motion of the oscillating end of the reed can be considered to be rectilinear in a plane parallel to the plane of the screen, instead of being a curve as would be the case for large amplitudes. Under these conditions, the oscillating motion of the frame 141 and screen 142 under the influence of the spring forces of the reeds can be regarded as a taking place in one plane in a single direction and therefore representing the rectilinear oscillation of a single-degree-of-freedom vibrational system.

It is further stipulated that the masses 153 are large enough to limit their amplitude of oscillation to the point where this oscillation can be regarded as taking place in a straight line parallel to the direction of oscillation of the frame-screen system.

It is further postulated that the spring forces transmitted from the reeds to the frame shall be zero when the reeds are in their position of rest, or middle position between maximum amplitudes to the right and left respectively, and that a spring force tending to move the screen to the right shall be counted as positive while a spring force to the left shall be counted as negative. Similarly, screen motion to the right is counted as positive, to the left as negative amplitude. Inspection of FIG. 15 shows that the diagram correctly illustrates the spring forces $F_s'$ acting upon the frame 141 in all positions between maximum positive amplitude plus $a$ and minus $a$. It is to be noted that the force $F_s'$ corresponds to the force developed by two reeds on each end, that is, the force $F_s'$ at the right hand of FIG. 15 represents the sum of the forces of reeds 102 and 103, and the diagram at the left represents the combined forces of reed 104 and reed 105. It is seen that the total force acting upon the frame-screen at maximum amplitude, either right or left, is $2F_s'$ (absolute value) and therefore the "spring constant" $k$ of the oscillating system is $$k = \frac{2F_s'}{a}$$

If the combined weight of the frame and screen is $W_f$, the mass $m_f$ of the oscillating system is $$m_f = \frac{W_f}{g}$$

where $g$ is the acceleration of gravity.

The natural frequency of the free oscillating system, disregarding the insignificant mass of the reeds and any damping effect, is then $$f_n = \frac{1}{2\pi}\sqrt{\frac{k}{m_f}}$$

oscillations per second and its circular frequency $$\omega = \sqrt{\frac{k}{m_f}}$$

radians per second or substituting $$\omega = \sqrt{\frac{2F_s'}{a \cdot m_f}}$$

The amplitudes shown in FIG. 15 are on a greatly enlarged scale with respect to the dimensions of FIG. 14, that is to the length of the reeds as shown, while in reality these amplitudes are small compared to the reed length as previously explained.

In the system of FIG. 14 and FIG. 15, the springs at each end of the oscillating mass are such that each spring force changes from a positive maximum through zero to a negative maximum. It shall now be shown that the identical frequency of oscillation is obtained in a system of identical oscillating mass if each end of the mass is acted upon only by a tension force of a spring having a spring "stiffness" or spring constant twice as great as before.

FIG. 16 is schematically illustrating a system consisting of a bar 341 with the same weight as the former frame-spring combination and a tension spring at each end of the bar, these springs being designated as 302 and 305, respectively. The other end of each spring is fastened to a lug 340 of a common base. A mass 353 is connected through a spring 354 to one of the lugs 340 so that it is capable of free oscillation in line with the oscillation of the mass 341. It is postulated that each of the springs 302 and 305 has a tension of zero for the position of equilibrium or middle position of the bar 341, and that the spring 302 develops only positive forces, that is to the right, rising to a maximum value of $$F_s = 2F_s'$$

for the amplitude minus $a$ while the spring 305 develops only forces to the left, rising to the same absolute maximum for the same absolute value of amplitude $a$. The diagram of forces acting during one cycle is then as illustrated in FIG. 17 and the two half-cycle diagrams can be combined into one for the full cycle as shown in FIG. 18. It is seen that the force of the spring 302 changes from plus $F_s$ (point $B_2$) for the full amplitude minus $a$ (point $A_2$) down to zero for the mid-point 0, while the force of spring 305 begins with zero at point 0 and increases to minus $F_s$ (point $B_1$) for the positive maximum amplitude plus $a$ (point $A_1$), then decreases to zero for amplitude zero whereupon spring 302 takes over increasing from zero to plus $F_s$ for amplitude minus $a$. The natural frequency of this system is the same as for the system previously considered, since $$f_n = \frac{1}{2\pi}\sqrt{\frac{F_s}{a.m_f}}$$

and $$F_s = 2F_s'$$

It is thus seen that the reed supported frame-screen system illustrated in FIGS. 13–14 can be replaced by a tension spring system without altering the frequency and mode of operation. It must be noted, however, that this is only true if the springs on both ends have the same diagram, that is, that they develop exactly the same force for the same amplitude or deflection. This is automatically secured in the case of round reeds, as in FIGS. 13–14, but may not be the case with two separate springs, unless special precautions are taken. The use of two springs of different force-amplitude diagram in a system similar to FIG. 16 would result in a system with two different frequencies within one cycle of oscillation, and not produce a single frequency, harmonic oscillation. Since the modification hereinafter described uses tension springs at both ends of the screen, this is an important point as will later be more fully explained.

FIG. 19 illustrates the operating conditions in a system where the tension springs at the ends of the mass (341 in FIG. 16) are so arranged that they do not come to zero force for the mid-point. As seen from FIG. 19, the spring pulling to the right (positive force) has the same maximum as before (point $B_2$) for the maximum negative amplitude (point $A_2$), but for the mid-point 0 it is still the positive value 0–C, and decreases to zero only for the point of maximum positive amplitude $A_1$. Conversely, the spring pulling to the left (negative force) has its maximum minus $F_s$ at point $B_1$ and for the mid-point 0 still has the value minus 0–$C_2$ and reaches zero pull only for the point of maximum negative amplitude $A_2$. The resulting force which acts upon the oscillating mass is of course always the difference between the two forces, and the effective spring diagram is the line $B_2$—$B_1$ as indicated by a heavy line. Comparing this diagram to the diagram shown in FIG. 18, it is clear that the effective forces of FIG. 19 are identical to those of FIG. 18, and that therefore the frequency of oscillation will be the same. It follows further from this analysis, that in an oscillating screen system, where the screen is subject to a pre-tension by the springs at both ends of the screen, that the frequency of oscillation is independent of the absolute value of the spring tension and is determined only by the mutual spring constants of the opposing springs. Therefore, it must be noted that changing the pre-tension will not change the frequency unless such increase or decrease of the pre-tension causes a simultaneous change of the spring constant of each of the springs. The use of these special properties of springs in an opposed arrangement as described in connection with the control of frequency of such systems will be referred to later on.

The considerations of the operation of oscillating screen systems up to this point have been made on the supposition that the screen and its supporting frame are behaving as one solid element that moves as a rigid body during the oscillation. While this is practically true in all cases where moderate frequencies, small amplitudes and screens of limited size are involved, the stresses and subsequent deflections within the oscillating element (screen-frame) can no longer be ignored where screens of over 12 inches are made to oscillate at frequencies substantially over 30 cycles per second. The inertial forces operating within the oscillating system are proportional to the moving masses, the amplitude and the square of the frequency; they reach their maximum at the end of each stroke or cycle at maximum amplitude where they are opposed by the accelerating forces of the springs; the interaction of these two systems of forces causes stresses and ensuing deflections within the oscillating element (frame plus screen) which deflections and deformations appear periodically at the end of each stroke. Under the operating conditions above mentioned, these deflections can become large enough to cause undesirable side effects, such as lateral vibrations of the screen, noise and others.

The effects of the interplay between the inertia forces and the spring forces are illustrated in FIG. 20. The screen 242 is mounted on a frame in a manner similar to that shown in FIGS. 13–14. The frame is considered at the instant of the reversal of its motion at the left end of the stroke, when it has reached maximum amplitude minus $a$. In order to simplify the following consideration, it is assumed that the frame surrounding the screen 242 consists of four bars, numbered 241$a$, 241$b$, 241$c$ and 241$d$, and they are shown in their approximate shape of deformation under the influence of the inertia forces. It is further assumed that the corners of the frame are not stiff, so that the bars will deflect under the inertia load as if they were joined in the corners by pivots. The calculation of the frame deformation with stiff corners is rather complex and while the total deflection so found is somewhat smaller than for the simplified case, this difference is insignificant when compared to the reduction of deformation achieved by the present modification of my invention, as will be seen below. Briefly, while the difference of deflection between a loose-corner frame and a stiff-corner frame may be of the order of 2:1 or 3:1, the ratio of deflection between a loose-corner frame and a system according to the present modification is of the order of at least 3000:1 to over 10,000:1, as will be seen later on. The simplification above postulated seems therefore fully justified.

With the screen 242 in the position shown in FIG. 20 it is seen that the inertia forces of all parts are directed to the left; the inertia forces of the bars 241$c$ and 241$d$ cause a slight lengthening of these bars, which is insignificantly small. The inertia forces of the bars 241a and 241b cause a deflection of these bars in the form of an arc, as indicated. The undeflected form and position of the bar 241a is indicated as 241' in dotted lines. This is the position of the bar at the end of the amplitude minus a if no inertia force would exist. The inertia forces of the bars 241a and 241b are uniformly distributed over the entire length of the bar, as shown for the bar 241a by the small arrows $j_t$. The forces upon the bar 241b, due to its own inertia are of the same order, and the bar 241b will deflect under its own inertia load the same amount as the bar 241a.

If we now consider the effect of the screen inertia, we find that the entire screen will be supported substantially by the bar 241a at the right end thereof, because it is fastened to the bar and the inertia forces tend to pull it away from this bar. The inertia forces of each narrow strip of screen material may be termed $j_s$ and each of these forces tends to pull the bar 241a to the left, superimposing its small load to the inertia force $j_t$ already acting upon the same element of the bar. It is obvious that a thin screen of the kind shown cannot be supported against motion to the left by the bar 241b, because bar 241b could only resist with a push to the right against the screen, which would make the screen buckle. While a small triangular-shaped portion of the screen is supported against motion to the left by the bars 241c and 241d, these effects are of such small order with respect to the final result that they can be disregarded.

Considering now FIG. 20, we have the case of a beam (bar 241a) supported on both ends (points 202 and 203) and carrying a uniformly distributed load L defined as $$L = \sum(j_t + j_s) = 2(\tfrac{1}{2}F_a)$$

where $F_a$ is the total accelerating force required to balance the inertia forces of the screen and the bar 241a. Note that the inertia forces of the rest of the frame, that is the bars 241b, 241c and 241d, have been disregarded here, because they do not by themselves cause a stress and deflection of the bar 241a, but are directly supported at the points 202 and 203. The total spring forces required to cause oscillation of the entire frame and screen would of course have to include also the inertia forces of the entire frame, but they have no bearing on the present consideration.

The maximum deflection D in the middle of a beam with a uniform load and supported at both free ends is given by $$D = \frac{5}{384} \cdot \frac{P \cdot l^3}{E \cdot l}$$

where P is the total load (equal to the sum of the support forces) therefore here $$P = 2 \cdot \tfrac{1}{2} F_a = F_a$$

and $$F_a = \sum(j_t + j_s) = \sum j_t + \sum j_s = J_t + J_s$$

and where l is the free length of the beam between the support points
E is the modulus of elasticity
I is the moment of inertia of the cross section of the beam (bar) defined as $$I = \frac{b \cdot h^3}{12}$$

for a central axis at right angles to h where "b" and "h" are dimensions of the cross section of the beam as defined in FIG. 21.

The maximum inertia force for the bar 241a is $$J_t = \frac{W_b}{g} \cdot a\omega^2$$

where $W_b$ is the weight of the bar
$g$ the acceleration of gravity
$a$ the maximum amplitude
$\omega$ the circular frequency.

Similarly, the total inertia force of the screen is $$J_s = \frac{W_s}{g} \cdot a \cdot \omega^2$$

and the total load upon the beam is $$F_a = \frac{W_b + W_s}{g} \cdot a \cdot \omega^2$$

The weight of the bar is given by $$W_b = b \cdot h \cdot l \cdot \gamma_b$$

where $\gamma_b$ is the specific gravity of the bar material, the weight of the screen is given by $$W_s = l \cdot q \cdot t \cdot \gamma_s$$

where $l$ is the length of the screen, $q$ its width and $\gamma_s$ the specific gravity of the screen material and $t$ its thickness. Therefore $$W_b + W_s = l \cdot (b \cdot h \cdot \gamma_b + q \cdot t \cdot \gamma_s)$$

and the total deflection D $$D = \frac{5}{32} \cdot \frac{l^4 \cdot (b \cdot h \cdot \gamma_b + q \cdot t \cdot \gamma_s)}{g \cdot E \cdot b \cdot h^3} \cdot a \cdot \omega^2$$

In a specific example with the following dimensions:

screen: $l = 10$ inches
$q = 10$ inches
$t = .015''$
$\gamma_s = .0466$ lb./in.$^3$ bar: $l = 10''$
$b = .093''$
$h = .625''$
$\gamma_b = .097$ lb./in.$^3$ modulus of electricity: $E = 11.10^6$ p.s.i.
frequency: $f_n = 60$ cycles per second
circular frequency: $\omega = 3.76.10^2$
amplitude: $a = .060''$
Total inertia force of bar: $241aJ_b = 1.48$ lbs.
screen: $J_s = 1.55$ lbs.
total inertia force: $F_a = 3.03$ lbs.
deflection at center: $D = .00187''$ This deflection takes place twice during each cycle, that is, with the frequency $f_n$ and it causes a certain amount of energy to flow into the bar and the screen to be stored as potential energy, and then to be delivered back to the system, minus losses of energy, during the first half of the return stroke. The total energy so transmitted in the example cited is near $3,6.10^{-2}$ watt, of which about half goes into the screen proper. A substantial fraction of this energy is lost through mechanical hysteresis and through sound radiated by the screen; the sound radiation may become disturbing to the user of the screen while the lateral oscillation of portions of the screen surface may reduce the resolving power of the screen.

The modified structure hereinafter described eliminates practically all of these difficulties by a system of uniformly distributed balancing forces, wherein each small partial inertia force is immediately balanced by a small partial accelerating force of equal size and in direct alignment therewith. In other words, the uniform distribution of inertia forces along the edges of the screen and frame is counterbalanced by an equally distributed arrangement of means producing opposing accelerating forces.

The basic principle of this structure is illustrated in FIG. 22 where the total length of the bar 441 is divided into a large number of small sections (about 20 in the illustration), and each section is provided with means exerting an accelerating force $f_a$ which is equal in size but directly opposed to the inertia force $j_t$ plus $j_s$ of each section.

It is evident for the structure of FIG. 22, there is no deflection over the total length of the bar 441 because there is no cumulative effect of the inertia forces. Only stresses which correspond to the partial forces can cause very small deflections within each of the sections. If the number of sections is $n$, it is seen that the stress pattern of the bar corresponds to the case of a continuous beam over $n$ supports.

FIG. 23 illustrates in a larger scale the conditions of forces and stress pattern for a portion of the bar between three supports. The bar 441 is seen to be supported equally at the points X, Y and Z, by the springs 402 of equal strength, each producing an accelerating force $F_a'$ and each connected to a balancing weight 453. The partial inertia forces $j_s$ plus $j_t$ form a uniform load for the beam 441 and cause its elastic curve to correspond to the wave line S in FIG. 23 where the tangents of this curve in the support points X, Y, Z, etc. fall into one straight line which is perpendicular to the direction of the inertia forces (line T in FIG. 23). The distance between each two adjoining support points is $l' = 1/n.1$.

The general formula for the deflection of a beam with the load conditions described is given as $$D' = \frac{1}{384} \cdot \frac{P' \cdot (l')^3}{E.I}$$

where $l'$ is the spacing between two adjoining supports and $P'$ the total load upon the section of length $l'$. The terms E and I are the same as before. Substituting for $$P' = 1/n.(W_b + W_s)$$

and for $$l' = 1/n.1$$

we find for D'

$$D' = \frac{1}{32} \cdot \frac{l^4 \cdot (b.h.\gamma_b + q.t.\gamma_s)}{g.E.b.h^3} \cdot a\omega^2$$

or $$D' = D.1/5.n^4$$

For the example given, $n = 20$, we find $$D' = D.1/8.10^5 = 2.33 \cdot 10^{-9} \text{ in.}$$

This result fully justifies the simplifications postulated at the beginning which cause the calculated deflections D to be somewhat larger than the figures found by the very complex computation without the postulated simplifications.

From the example above given, it is evident that the structure according to this modificaiton of my invention reduces the possible deflections and deformations due to inertia loads within the system from a value of the order of 1–2 thousandths of an inch to the order of 1–2 thousandths of one micro-inch, or practically to zero.

At the same time the accelerating forces acting upon each of the support points have been reduced from 1–2 lbs. to the order of 1–2 ounces. As a result, the frame surrounding the screen made of comparatively heavy bars can be eliminated and replaced by a mere re-enforcement of the edge of the screen.

FIG. 23 also illustrates how each support point, X, Y, Z, is directly connected to a sectional balancing mass 453 through a spring which furnishes the partial accelerating force $F_a'$. Each of these balancing masses is coordinated to the mass of a section of the screen and the center of gravity of the mass 453 oscillates in line with, but in opposite direction to the motion of the center of gravity of the coordinated section of the screen. The amplitude of these balancing masses as compared to the amplitude of the screen is in inverse proportion to the ratio of weight of the mass 453 to the weight of a section of the screen, that is a strip of screen of width $l'$ and the length $q$. Since the weight of all these strips, or sections are equal, the weights of the balancing masses are also equal as between one and another, and they have the same amplitude and phase of oscillation. They may therefore be connected into one single mass extending along the edge of the screen and parallel thereto. This may be done, provided that all springs have the same force and stiffness; this condition may be obtained by providing an equalizing element between the springs and the balancing mass.

FIG. 24 illustrates by way of example a preferred form of embodiment which includes several of the special features discussed in the foregoing lines. FIG. 24 is a top view and FIG. 25 is an elevated sectional view, the section taken along the line A—A of FIG. 24. Referring to FIG. 24, the screen proper is 442, which may have a re-enforced edge 441. Along each of the four edges are provided equally spaced holes 411 which are engaged by small hooks 405. The screen illustrated is supposed to have a size of 10 x 10 inches, and there are 21 holes on each side spaced at ½ inch from each other. Surrounding the screen is a solid frame 553 which represents the balancing mass substantially uniformly distributed along the circumference of the screen. The wire hooks 405 pass above the upper face of the frame 553 and are in their outer portion curved to engage the outer part of the surface of a tubular member, made of resilient material, such as rubber, or certain plastics, 406, at the right hand side of FIG. 24 and FIG. 25. All hooks are made of substantially identical shape, so that all hooks engage the elastic tube substantially simultaneously. However, small differences in the length of the hooks are equalized by the resiliency of the tube 406. The inner portion of the tube surface bears against the outer edge of the frame 553. The upper end of the tube 406 is closed while the lower end extends outside the housing 415 which serves as a support for the screen. Small resilient stilts or reeds 412 support the balancing frame 553 from the base 415, as shown in FIG. 25.

All four sides of the screen are resiliently connected to the respective sides of the balance frame, the tubes at each of the sides have one end closed and the other carried outside the main housing 415. It is seen that the tubes 406, 407 are on opposite sides of the screen in a horizontal direction and the tubes 408, 409 are on opposite sides in a vertical direction. It is noted that the main housing enclosing the entire oscillating system requires only a moderate space as compared to the dimensions of the screen proper, a feature which greatly facilitates the adaptation of this type of screen to existing optical instruments.

The resilient tubes 406, 407, 408 and 409 are connected to a device which permits the increase of air pressure in each of these tubes and also to vary this pressure periodically, so that the pressure in one tube may be increased while the pressure in the opposite tube will be decreased. Such pressure modulation will cause a difference in the pull forces acting upon the two opposite edges of the screen, and therefore move the screen with respect to frame 553 in a direction tending to equalize the pressures in the opposing tubes. In other words, modulating the pressure in the tubes by introducing a periodically changing pressure differential in opposite tubes tends to produce a periodic oscillation in one direction between the screen and the surrounding frame.

The relative positions between the screen edge and the adjacent frame edge are illustrated in FIGS. 26 to 28. The closest approach between the screen edge and the balance frame is shown in FIG. 25, and this represents the maximum amplitude of the screen towards the left. In this position the pull of the hook 405 towards the left is at a minimum, as indicated by $a_1$, and the tube 407 is expanded to its maximum. One-half cycle later, the relative position of the left screen edge and the balance frame corresponds to that shown in FIG. 28. The distance between the screen edge and frame is now at its maximum marked $a_3$ and the hooks 405 are in relative position marked $405_b$. The tube cross-section just under the hook is reduced to $407_b$ and the force with which the hook is pulling the screen towards the left is at its maximum. The relative position for ¼ cycle after the position of FIG. 26 is shown in FIG. 27, where the distance of the screen edge to the frame edge is marked $a_2$. If oscillation of the screen in only one direction were considered, that is, only in a horizontal direction under the exclusive influences of spring forces of tubes 406 and 407, this position would mark the equilibrium position in the oscillation of the screen, and the position of the holes $411_a$ would be on a horizontal line with the positions of these holes as shown in either FIG. 26 or FIG. 28, while their distance from the frame edge would be the same as shown in FIG. 27.

However, if a second oscillation in the vertical direction, that is, under the influence of the spring forces of the tubes 408, 409 takes place simultaneously, and at a phase angle of 90° (or ¼ cycle) behind or ahead of the oscillation between 406 and 407, then the screen motion to either side (up or down, respectively) will be at its maximum amplitude. This is shown in FIG. 27 where the position of the hooks 405 is marked $405_a$, or alternately in dotted lines $405_b$. It is seen that this up and down displacement of the screen can take place without hindrance by the hooks 405, because they can pivot about their point of support by the resilient tube $407_a$. Since the total motion of the holes 411, between $411_a$ and $411_b$ is small compared with the length of the hook 405 between its pivot point at tube 407 and the hole 411, the path of the hole 411 between $411_a$ and $411_b$ can be treated as a straight line so that no horizontal force is added to the horizontal forces of tubes 406 and 407. This is to say that the two oscillations, in two directions at right angles to each other, can take place without interference with each other.

The screen will follow the vectorial sum of the motions of each of the two separate oscillations, and for equal amplitudes at 90° phase difference, the resultant orbital motion will be a circular path, as has been shown previously in connection with FIGS. 1 and 2.

A complete system of a screen according to FIG. 24 together with a mechanism for causing two independent oscillations at right angles to each other and including means for changing the angle of phase difference while the system is oscillating, as well as means for controlling the natural frequency of the system is shown in FIG. 29.

The screen proper 442 is mounted in the manner described by means of pivoting hooks 405 between the resilient tubes 406, 407 and 408, 409. The balancing frame 553 is again free to oscillate with 180° phase difference to the screen 442, as shown in FIGS. 24 to 28. The open ends of the tubes 406 and 407 are connected by rigid tubes 416 and 417, respectively, to a device comprising two resilient elements 448 and 449, respectively. These resilient elements rest on one side thereof against solid lugs 450 and 451, respectively, and between them is positioned a member 456 which slightly compresses both element 448 and 449. The member 456 is carried by a lever 457 which is pivoted at 460 to a solid lug 427. The lever 457 is provided with a cam follower 458 which is forced to a lateral motion by the cam wheel 455. This cam wheel is provided with a number of cams 459 which are evenly spaced around its circumference. This cam wheel is provided with a gear or sprocket 461 which is driven by a chain drive from a similar gear 463, fastened to the shaft of a synchronous motor 464. Each of the ducts 416 and 417 is connected by a tubing of very small diameter and valves 445 and 446, respectively, to a cylinder 465. A manually operable knob 466 controls the position of a piston 467 through the screw 468 and permits the manual control of the pressure in the cylinder 465. When the valves 445 and 446 are opened, this pressure is transmitted to the resilient tubes 406 and 407. It is seen that the oscillating motion of the member 456 produces cyclic pressure modulations in the tubes 406, 407 which in turn will cause maximum amplitude oscillations of the screen for the case where the natural frequency of the free oscillating screen system is in resonance with the frequency of the modulating pressure cycles induced by member 456. For a given frequency of the current feeding the synchronous motor 464, the frequency of the screen system can be tuned to resonance by altering the spring constant (stiffness) of the spring system which comprises the resilient tubes and the hooks 405, by changes in the basic pressure within the tubes 406, 407 through the control knob 466. The arrangement so far described causes and controls the oscillation of the screen-frame system in a direction from right to left, or horizontal direction.

An identical arrangement is made with regard to tubes 408, 409 which are connected by rigid tubes 418, 419 to the resilient elements 420, 421, respectively. These are positioned between the solid lugs 422, 423 and between them is positioned the member 424 which can swing between them because it is fastened to the end of the lever 425 which is pivoted at 426 to the solid lug 427. The lever 425 has a cam follower 428 which engages the cams at the circumference of the cam wheel 436. This cam wheel is driven through a sprocket 438, chain 439 from a sprocket 440 fastened to the shaft of a synchronous motor 447. The two tubes 408 and 409, respectively, are connected through thin ducts and valves 430, 431 to a cylinder 432 whose pressure is controlled through the manually operable knob 435, screw 434 and piston 433. This second system so far described permits to cause and control the oscillations of the screen in a vertical direction between the tubes 408, 409.

If both systems are operated at the same time, the screen motion will correspond to the vectorial sum of the two oscillations. It has been shown that the two oscillating motions at right angles to each other are independent and that the systems causing such oscillations are independent from each other, since the two synchronous motors can be driven from two independent sources. It has been pointed out previously that a single straight line oscillation is undesirable, and that the resolving power of the screen is improved if the orbital motion covers as much area as practical. This requirement can be fulfilled very advantageously with the system shown in FIG. 29, because it lends itself to the use of two oscillations with a difference of frequency.

The system shown in FIG. 29 illustrates a frequency ratio of 4:5, because the cam wheel driving the horizontal oscillation has four cams while the wheel controlling the vertical motion has five cams. When both synchronous motors are connected to the same power source, they will keep the relative position of their armatures unchanged, unless means are used to retard or accelerate the phase angle of the current fed to one of the motors. This is shown in FIG. 29 by the variable inductance comprising coil 470 and adjustable core 471 in the feeder lines of the motor 447. Thus the motor and with it the cam wheel 436 can be retarded behind the cam wheel 455 without changing the frequency of either system.

The effects of change of phase angle is shown in FIGS. 33 and 34. FIG. 33 is the orbital path for a 4:5 frequency ratio if the phase is such that both oscillations start at the same instant at maximum amplitude. The orbit starts at point "A," loops down to point F, reverses itself and returns by the same path to point "A." It is seen that the orbit crosses the total area permitted by the maximum amplitude only four times in each direction.

FIG. 34 shows the effect of retarding the vertical oscillation for ¼ of the cycle of the horizontal, so that the vertical motion reaches its maximum only when the horizontal is already down to zero. The manner in which these two diagrams come about will be shown on hand of the FIGS. 30, 31 and 32. It is to be noted that the orbit of FIG. 34 crosses the total area nine times substantially parallel to each of the diagonal directions, and that the entire area is well and uniformly covered by orbit lines.

A still more closely spaced covering can be obtained by choosing other ratios of frequency. For example, with a ratio of 6:5 a pattern similar to FIG. 34 can be obtained which has 11 crossings substantially parallel to the two diagonal directions, and with 7:6 there are 13 crossings in each direction.

A brief method for obtaining the pattern of Lissajou figures with a fair degree of accuracy is given with the help of FIGS. 30, 31 and 32. The vector diagram at the left side of FIG. 30 shows that a succession of four sine waves during one revolution of the diagram is obtained when the circular vector diagram is rotated clockwise and the passing of each of the four vectors over the positive Y axis (vertical, upper half) is taken as maximum positive amplitude. A rotation of 90° of the vector wheel corresponds to 360° of the sine wave, because it coincides with the maximum positive amplitude of the second wave. Similarly, rotation of the vector wheel through 45° corresponds to 180° of the sine wave, and 22½° rotation of the vectors corresponds to 90° on the wave diagram. In other words, rotation of the vector wheel through 22½° appears in the sine wave diagram as the portion of the wave from point "A" to point "1" on the horizontal axis. Rotation of the vectors through 45° corresponds to 180° and the point "2" on the wave diagram. Rotation of the vector wheel through 90° is shown in the wave diagram as the sine wave from "A" to "4," and so forth. It is noted that the true ordinates of the sine wave cannot be obtained through projection of the vectors upon the vertical or Y axis, but must be taken from tables, or from a separate vector diagram having only one vector rotating at four times the speed of the vector wheel of FIG. 30.

The wave diagram shown in FIG. 31 is designed in the same way from the rotation of the vector wheel having five equally spaced vectors. The true spacing between each two vectors is of course 72°, which now correspond to the 360° of one full sine wave. The vector wheel of FIG. 31 is shown in a position where one of the vectors is at maximum at the same time as one of the vectors of FIG. 30. Therefore, the sine wave of FIG. 31 starts an oscillation at maximum positive amplitude at the same time as wave FIG. 30, but completes five full cycles, or sine waves, in the same time as FIG. 30 completes four full cycles. If a vertical ordinate line is moved over both wave diagrams from left to right, it will by its intersection with each of the sine waves define an ordinate for each of the sine waves, which ordinates exist at the same moment of time and which denote the position of the traveling orbit point in the diagram FIG. 33.

Example: Point "A" of FIG. 30 denotes positive maximum amplitude along the X axis, because it was stipulated the horizontal oscillation completes four cycles to five cycles of the vertical motion. At the same time, FIG. 31 has point "A" at maximum positive amplitude vertical, therefore point "A" in FIG. 33 is at the right upper corner of the square. Note that the scale of FIG. 33 is larger by more than twice the scale of FIGS. 30 and 31. After 90° oscillation of wave 30, it reaches the X axis, but wave 31 being faster by 5:4 is already below its X axis. The intersection of the orbit curve with the X axis is therefore to the right of the Y axis, and its intersection with the Y axis is below the X axis. The wave 31 reaches its negative maximum first, point "B" when the wave 30 has not yet reached its negative maximum, point "2." At this moment the wave 31 is already on the return swing and reaches its positive maximum at point "C"; wave 30 reaches its maximum (horizontal) amplitude at point "4" and has therefore completed one full cycle. Wave 31 being 5:4 faster has now completed 1¼ cycle, and therefore is intersecting the X axis giving a vertical amplitude of zero. One-quarter of the orbit has now been completed, and the second quarter is symmetrical to the first with respect to the X axis of FIG. 33. The second quarter of the orbit curve ends at a point "F" at the lower right corner. One-half of the orbit is completed, and the two oscillations which started out with 0° phase difference have now accumulated 180° phase difference. The orbital movement reverses itself and retraces the same path in opposite direction until it reaches again the point "A" after four full cycles of wave 30 and five full cycles of wave 31. Then it reverses and repeats. It is seen that the portion of the orbit near the points "A" and "F" are very close to straight line back-and-forth oscillations and for this reason not particularly desirable for screen motion, giving rise to streaky or scratchy appearance of projected images.

This reversal of motion upon the same path can be avoided by providing the proper phase difference between the two oscillations, in the present case 90° between the maximum positive amplitude of wave 30 and maximum positive amplitude of wave 31, shown as wave 32 in FIG. 32.

Wave 32 reaches positive maximum when wave 30 is down to zero (which is 90° after its maximum) at point "1." This is the point at top center FIG. 34, horizontal amplitude zero, vertical amplitude positive maximum. Horiztonal negative maximum at point "2" when wave 32 is negative. Vertical amplitude reaches negative maximum at point "3" when wave 30 is already on return stroke. Horiztonal amplitude reaches maximum first, at point "4," while vertical wave reaches positive maximum a little later at point "5." Both waves reach zero amplitude at point "6" and both have at this point completed one-quarter of the full orbit. Wave 30 has completed one full cycle, while wave 32 has completed one and one-quarter of a full cycle. The orbit continues through the points "7," "8," "9," "10" to point "11" which is symmetrical to point "1" with respect to the X axis. The orbit during the second half is symmetrical to the path of the first half with respect to the X axis, and reaches the point "1" without any reversal of motion.

It is seen from FIG. 32 that the retarding phase angle of 90° of the sine wave corresponds to 22½ degrees on the vector wheel of FIG. 30. In other words, the two cam wheels of FIG. 29, 436 and 455, must be so arranged that one of the cam-symmetry lines of cam 436 is 22½ degrees "behind" one of the cam-symmetry lines of cam 455. For a permanent installation, this is done by putting the cam wheels upon one common rotational axis with the proper retarding angle between them. In FIG. 29, the cams are shown in zero degree phase difference, that is the case illustrated in FIG. 31 and FIG. 33. With the complete system as illustrated in FIG. 29, it is possible to shift the phase retarding angle during operation by changing the phase angle of the A.C. current for one of the two synchronous motors 447 and 464. It is then possible to observe the change from one of the orbit patterns to the other while observing the effect upon the screen resolution.

While a system of motor driven cams has been shown in FIG. 29 as a means to control the phase of the two oscillations, it is obvious that a system of oscillating solenoid cores, operating directly upon the resilient tubes, can be used whereby the solenoids are excited by A.C. currents of different frequency. I also contemplate to separate the oscillation exciter from the tube system, using the tubes only for control of tension upon the screen and for the purpose of changing the natural frequency of the screen-balance frame-system. Excitation of this oscillating system is then achieved by direct electro-magnetic or electro-dynamic action, as has been described in connection with FIGS. 3 to 11.

Various changes and modifications may be made without departing from the spirit and scope of the present invention and it is intended that such obvious changes and modifications be embraced by the annexed claims.

What is claimed is:

1. In combination with a projection screen, a free oscillating system having a primary inertia mass which includes the mass of said projection screen, a vibrating power device and secondary inertia masses supported for free vibration in all directions parallel to the surface of said screen, said primary system being tuned to a frequency within 25% of the frequency of said vibrating power device.

2. In combination with a projection screen, a free oscillating primary system having a primary inertia mass which comprises the inertia mass of said projection screen, auxiliary inertia masses yieldably supported from said primary system so as to be capable of free oscillation with a difference of phase and direction with respect to said primary mass, and means for feeding periodic impulses to said system to maintain its oscillation.

3. In combination, a projection screen, deflectable supporting means for said screen for maintaining it in a central position of rest within its own plane, inertia masses movable relatively to said screen and to said supporting means, said screen, said deflectable supporting means and said inertia masses being so constructed and associated that said deflectable means tend to return said screen to its central resting position in a curved orbital path whenever said screen is displaced from said central position, and means for periodically displacing said screen from said central position.

4. In combination, a plane projection screen having a surface consisting of light scattering elements, yieldable means supporting said screen for free oscillation in every direction of its own plane, means included in said supporting means and restricting displacements of said screen to directions parallel to the plane of said screen, power means periodically furnishing impulses to maintain said oscillation, said yieldable means being constructed to co-act with said power means to cause each of said elements of the screen to oscillate in a cyclic orbital path of substantially uniform size of at least five times the size of said elements.

5. In combination with a projection screen, a base; a supporting frame for said screen; means resiliently connecting said supporting frame to said base and confining the movements thereof to those directions which are parallel to the plane of said screen whereby the system comprising said frame and said screen has a predetermined natural period of vibration in any one of said directions; cyclically operative power energized means acting on said system, said power energized means producing orbital movements of said screen; and means resiliently connecting said power operated means to said base whereby said power operated means has a natural period of vibration, the cyclical frequency of operation of said power operated means and said natural periods of vibration all being within substantially 25% of one another.

6. In combination with a plane projection screen having a surface composed of light scattering elements, an oscillating system comprising the inertia mass of said screen, yieldable means supporting said screen for displacement in all directions lying within the plane of its surface, said yieldable means including means restricting said displacement to said directions, and power means furnishing impulses to maintain simultaneous oscillations of said screen in two mutually perpendicular directions with a difference in phase between the oscillations respectively in said perpendicular directions.

7. In combination with a plane projection screen, an oscillating system comprising the inertia mass of said screen, elastic means supporting said screen for free oscillating motion in every direction of its own plane, power means co-acting with said supporting means and with said screen to cause said screen to oscillate simultaneously with two different frequencies in two different directions co-planar to the surface of said screen and means restricting the oscillatory movements of said screen to directions lying within the plane thereof.

8. The combination with a plane projection screen of an oscillating system comprising elastic means and inertia masses which include the inertia mass of said screen, means supporting said screen movably in every direction of its own plane, power means operatively connected to said oscillating system maintaining continuous oscillations of said screen co-planar to its own surface, continuously adjustable means operable during operation of said power means to vary the frequency of oscillation of said system to permit the tuning of said system to a predetermined frequency, and means restricting the oscillatory movements of said screen to those directions which lie within the plane of said screen.

9. In combination with a projection screen, means supporting said screen for free oscillating motion within its own plane, a movable balancing mass surrounding the circumference of said screen while providing a space between said screen and said balancing mass so as to permit relative motion between said screen and said mass in all directions parallel to the plane of said screen, and common supporting means for said screen and said mass, said balancing means preventing the transmission of vibrations beyond said supporting means.

10. In combination with a projection screen, means supporting said screen for free oscillation in all directions parallel to its own plane, a balancing mass spaced from said screen and freely movable in said directions, said mass surrounding the periphery of said screen with substantially uniform distribution of said mass around said screen, and common supporting means for said mass and said screen, said balancing mass preventing the transmission of vibrations beyond said common supporting means.

11. In combination, a movable projection screen, an independently movable balancing mass surrounding said screen spaced therefrom along its entire periphery, means for yieldably producing substantially uniformly peripherally distributed tension forces between the periphery of said screen and said balancing mass, and common supporting means for said screen and said mass, said mass preventing the transmission of vibrations from said screen beyond said supporting means.

12. In combination with a flat projection screen, means supporting said screen for oscillating motion restricted to all directions substantially parallel to its own plane, a balancing mass movable relatively to said screen in all of said directions, said balancing mass surrounding said screen in the form of a frame spaced therefrom and movable independently thereof, and connecting means mechanically coupling said screen to said mass, said mass acting upon said connecting means to cancel the effect of the vibration of said screen upon said connecting means.

13. The combination according to claim 9, wherein the weight of said balancing mass is substantially uniformly distributed adjacent the periphery of said screen.

14. In combination with a projection screen, resilient means connected to the edges of said screen in substantially symmetrical distribution with respect to its center and constructed to transmit to said screen co-planar forces in at least four directions so that said screen is susceptible of simultaneous free linear oscillations in two neutrally perpendicular directions, balancing masses adapted for free orbital oscillation co-planar with but in opposite phase to the oscillations of said screen, said balancing masses being arranged substantially symmetrically with respect to the center of said screen, and vibrating power means to excite orbital motions of said screen.

15. In a device of the kind referred to, a plane screen, resilient means attached near the periphery of said screen in substantially symmetrical distribution with respect to its center and constructed to transmit to said screen only co-planar forces in several directions so that said resilient means with said screen form a mechanical system capable of free co-planar oscillations which have independent amplitudes and frequencies respectively in the two directions of the main axes of a plane coordinate system, and power vibrating means for exciting orbital motions of said screen, the paths of said orbital motions lying within the plane of said screen.

16. In combination with a projection screen, prestressed resilient means connected to said screen in substantially symmetrical distribution of forces with respect to the center of said screen and constructed to transmit thereto co-planar forces in at least four directions so that said screen is susceptible of simultaneous free linear oscillations in two mutually perpendicular directions, means for producing a phase difference between oscillations in said two directions, and tuning means for varying the prestressing of said resilient means whereby its resonant frequency may be altered.

17. In a device of the kind referred to, a screen, resilient means connected to the periphery of said screen and arranged in two portions which transmit co-planar forces to said screen in directions at right angles to each other respectively, the spring constant of one of said portions being different from the spring constant for the other portion by an amount sufficient to cause oscillation of said screen simultaneously in said directions with two different frequencies combining in a Lissajou pattern orbital path.

18. In combination, a plane screen, deflectable means supporting said screen for free co-planar oscillation with substantially equal amplitudes in all directions, and power means adapted to deliver to said screen periodic impulses in at least two directions co-planar with said screen and forming an angle with each other.

19. In combination, a screen, deflectable means supporting said screen for free oscillation with substantially equal amplitudes in all co-planar directions, said screen and said deflectable means being so constructed that the polar speed vector for any point of said screen surface sweeps substantially over 360° during each cycle and maintains a positive substantial value during each cycle.

20. In combination with a projection screen having a surface composed of light scattering elements, an oscillating system comprising the inertia mass of said screen, yieldable means supporting said screen movable in all directions co-planar to its surface and power means furnishing impulses to maintain simultaneous oscillations of said screen in two co-planar directions having an angle of substantially 90° to each other and with a difference of phase between the oscillations respectively in the said two directions.

21. In combination with a projection screen, an oscillating system comprising the inertia mass of said screen, elastic means supporting said screen for free oscillating motion in every direction of its own plane, and power means co-acting with said supporting means and with said screen to cause said screen to oscillate simultaneously with two different frequencies in two different directions co-planar to the surface of said screen.

References Cited in the file of this patent

UNITED STATES PATENTS

| | | |
|---|---|---|
| 1,772,782 | Noaillon | Aug. 12, 1930 |
| 2,029,500 | O'Brien | Feb. 4, 1936 |
| 2,154,898 | Grimson et al. | Apr. 18, 1939 |
| 2,371,172 | Hotchner | Mar. 13, 1945 |
| 2,422,174 | Adams | June 17, 1947 |
| 2,525,596 | Finn | Oct. 10, 1950 |

FOREIGN PATENTS

| | | |
|---|---|---|
| 578,266 | Germany | June 12, 1933 |
| 764,297 | France | Mar. 5, 1934 |